(12) United States Patent
Van Maasakkers

(10) Patent No.: US 9,282,832 B2
(45) Date of Patent: Mar. 15, 2016

(54) CORNER CLAMP AND METHOD FOR PROVIDING A SUSPENSION POINT IN A THREE-DIMENSIONAL SPACE

(76) Inventor: Wilhelmus Henricus Albertus Van Maasakkers, Breda (NL)

( * ) Notice: Subject to any disclaimer, the term of this patent is extended or adjusted under 35 U.S.C. 154(b) by 814 days.

(21) Appl. No.: 13/056,774

(22) PCT Filed: Jul. 23, 2009

(86) PCT No.: PCT/NL2009/050455
§ 371 (c)(1),
(2), (4) Date: Apr. 12, 2011

(87) PCT Pub. No.: WO2010/014003
PCT Pub. Date: Feb. 4, 2010

(65) Prior Publication Data
US 2011/0297811 A1 Dec. 8, 2011

(30) Foreign Application Priority Data

Jul. 31, 2008 (NL) ..................................... 1035777

(51) Int. Cl.
*A47G 1/10* (2006.01)
*A47G 1/16* (2006.01)
*F16B 2/18* (2006.01)

(52) U.S. Cl.
CPC .................. *A47G 1/1653* (2013.01); *F16B 2/18* (2013.01); *Y10T 29/49826* (2015.01)

(58) Field of Classification Search
USPC .............. 248/316.1, 317, 304, 306, 322, 339, 248/691, 692, 307, 914
See application file for complete search history.

(56) References Cited

U.S. PATENT DOCUMENTS

| | | | |
|---|---|---|---|
| 680,230 A | 8/1901 | Deppe | |
| 1,354,807 A | 10/1920 | Dietrich | |
| 2,155,888 A | 4/1939 | Boomgarden | |
| 2,500,881 A * | 3/1950 | Stader | 211/85.3 |
| 2,516,760 A * | 7/1950 | Doran | 211/85.3 |
| 2,706,049 A * | 4/1955 | Andrews | 224/482 |
| 2,842,822 A * | 7/1958 | Bennett | 24/370 |
| 2,892,606 A | 6/1959 | Addicks | |
| 3,030,681 A * | 4/1962 | Phillips | 248/229.15 |

(Continued)

FOREIGN PATENT DOCUMENTS

DE 29913099 U1 1/2001
DE 102006034343 A1 1/2008

OTHER PUBLICATIONS

Asbeck et al., "Climbing rough vertical surfaces with hierarchical directional adhesion", Stanford University, Standford, CA 94305.

*Primary Examiner* — Monica Millner
(74) *Attorney, Agent, or Firm* — The Webb Law Firm

(57) ABSTRACT

A corner clamp for clamping thereof between two surfaces substantially at right angles to each other includes a first rigid element having a first outer end for supporting, optionally via a contact member which can be fixed thereto, on a first of the two surfaces; a second rigid element having a second outer end for supporting, optionally via a contact member coupled thereto, on a second of the two surfaces. The second element is coupled pivotally to the first element at a pivot point. The corner clamp has one or more placing states in which the elements are positioned such that, when clamped in the corner, the pivot point is situated between the corner and a straight line running from the first outer end to the second outer end.

20 Claims, 8 Drawing Sheets

(56) References Cited

U.S. PATENT DOCUMENTS

| | | | | |
|---|---|---|---|---|
| 3,612,459 A | * | 10/1971 | Walls | 248/215 |
| 4,101,103 A | * | 7/1978 | Mooney et al. | 248/58 |
| 4,194,714 A | * | 3/1980 | Schultz | 248/308 |
| 4,258,895 A | * | 3/1981 | Rorie | 248/544 |
| 5,301,393 A | * | 4/1994 | Brown | 24/67.7 |
| 5,657,953 A | | 8/1997 | Smith | |
| 5,890,689 A | * | 4/1999 | Johnson | 248/208 |
| 8,113,476 B2 | * | 2/2012 | Serio | 248/308 |
| 8,162,276 B2 | * | 4/2012 | Fathi et al. | 248/305 |
| 2002/0047079 A1 | * | 4/2002 | Gerson | 248/339 |

* cited by examiner

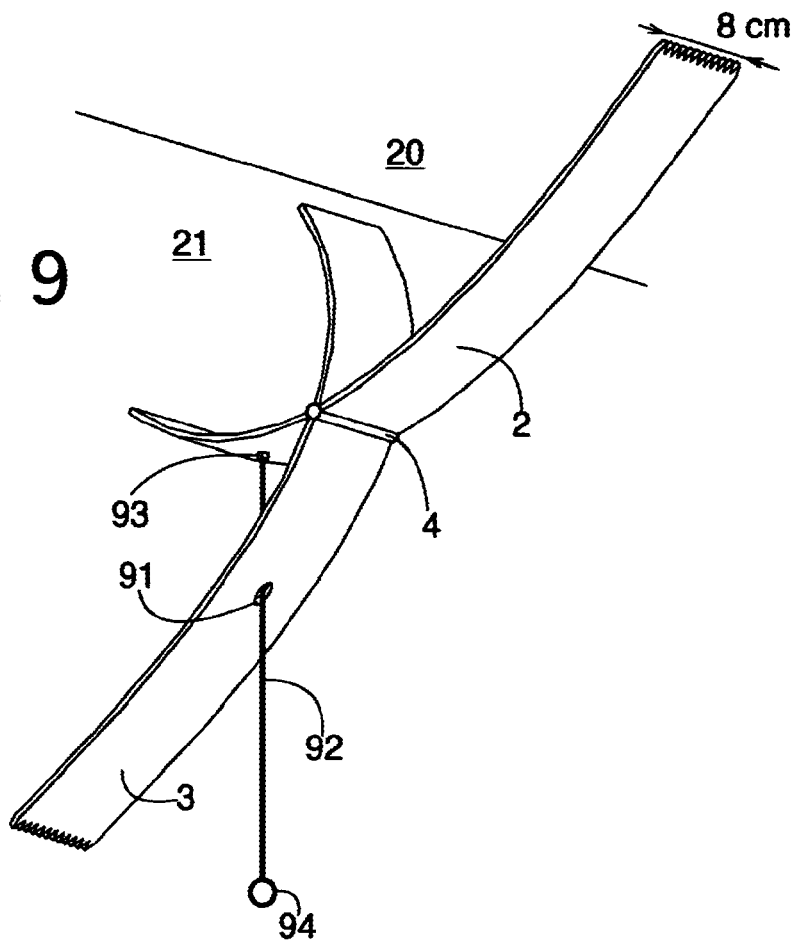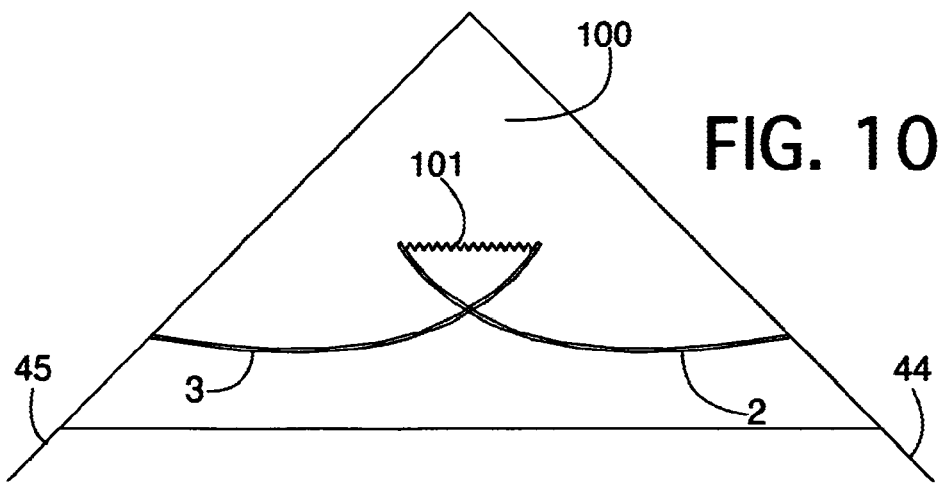

CORNER CLAMP AND METHOD FOR PROVIDING A SUSPENSION POINT IN A THREE-DIMENSIONAL SPACE

BACKGROUND OF THE INVENTION

1. Field of the Invention

The present invention relates to a corner clamp and method for hanging articles in a space. The corner clamp can for instance be used to hang paintings against the wall.

2. Description of the Related Art

In order to hang an article such as a painting use is often made of hooks, nails or screws which are hammered or screwed into the wall. When screws are used a hole is first drilled, after which a plug is for instance inserted. If the painting must be moved or removed, damage to the wall remains. An alternative is to use a rail system wherein the paintings can be moved in simple manner. The necessity of drilling into the wall remains however, with the associated damage.

Patent publication DE102006034343 A1 describes a corner clamp which in an embodiment comprises two rigid elements which are attached to each other at a pivot point. The clamp can be fixed in a corner between for instance a wall and a ceiling. The corner clamp serves as suspension system for decorations and paintings. A drawback of such a corner clamp is that it comes away from the corner quite easily and that the possible applications are therefore very limited.

SUMMARY OF THE INVENTION

It is an object of the present invention to provide an improved corner clamp.

This object is achieved with a corner clamp for clamping thereof between two surfaces substantially at right angles to each other, including:
- a first rigid element having a first outer end for supporting, optionally via a contact member which can be fixed thereto, on a first of the two surfaces;
- a second rigid element having a second outer end for supporting, optionally via a contact member coupled thereto, on a second of the two surfaces, wherein the second element is coupled pivotally to the first element at a pivot point;
- wherein the corner clamp has one or more placing states in which the elements are positioned such that, when clamped in the corner, the pivot point is situated between the corner and a straight line running from the first outer end to the second outer end.

When a force away from the corner is exerted on the pivot point, the elements of the corner clamp tend to spread further. They will hereby become fixed in or against the surfaces. The force away from the corner can be caused by hanging an article via for instance a cord at a suitable position of the corner clamp. The suitable position can be the pivot point itself, but can also be a fastening member coupled to one of the rigid elements.

Clamping the corner clamp creates in simple manner an attachment point from which an article can be suspended. Substantially no damage is caused here to the walls or the ceiling. The clamp is easy to mount and also easy to remove again. The clamp can be attached at different locations and is highly multi-functional.

During placing of the clamp the elements must be pivoted relative to each other such that the pivot point, as seen from the corner formed by the surfaces, does not pass beyond an imaginary straight line running through the two contact points of the clamp with the surfaces. If the pivot point passes (or is) beyond this line, the clamp will come away from the corner. The pivot point must however not be placed too far into the corner either, because the normal forces on the surfaces at the contact points can then become too small.

In a preferred embodiment the corner clamp includes a tensioning member which is adapted to spread the elements. The advantage hereof is that the clamp clamps itself fixedly and remains in the corner even without an article being hung. In an embodiment the tensioning member comprises a torsion spring arranged in or round the pivot point.

The elements are preferably of identical form, whereby the whole clamp can be made in economic manner.

The elements can for instance consist of curved rods or curved elongate plates. The curving results in a configuration which facilitates the clamping of the clamp. It is noted that the rods can also be straight. The elements can also include rods with two straight parts placed at an angle. It is also possible to envisage the rigid elements being wider than they are long.

In a special embodiment the outer ends of the rigid elements are tapering. The elements preferably include metal legs which penetrate to some extent with their sharp, tapering outer ends into the surfaces. It is noted that no damage, or at least very little damage, is however caused here to the walls and ceilings. This depends of course on the quality of the walls and on the forces exerted on the clamp.

In another embodiment a first and/or second contact member are mounted pivotally on respectively the first and second rigid element. The contact members have a contact surface for making contact with the associated surface, wherein the contact surfaces comprise one or more of:
- rubber;
- gel;
- gecko adhesive strip;
- sandpaper;
- spikes;
- suction cups;
- adhesive.

Said materials have a relatively high friction coefficient with stone or concrete. A material is preferably used which has a friction coefficient with a value above 1.0, and more preferably above 1.2.

In an embodiment the second outer end has an outer end which is angular as seen from above, so that it can be placed in a corner of two vertical walls, wherein the first outer end is placed against a ceiling. This embodiment makes possible a suspension system which can be placed precisely in a corner of a room.

In an embodiment the corner clamp comprises a fastening member for fastening the article, such as a painting, for instance via a cord.

In a special embodiment the first element comprises a first arm and a second arm which are defined by the pivot point, wherein the first arm ends at the first outer end and wherein the fastening member is arranged in or on the second arm. The second arm functions as a kind of lever, wherein the force exerted on the fastening member, usually vertically downward, is converted into a greater force on the pivot point. The clamp will hereby already be clamped firmly in the corner even without tensioning member and in the case of relatively light articles for hanging.

The second arm of the first element preferably has a length such that, at least in use, the fastening member is positioned close to the surface with which the second contact member comes into contact. A cord can hereby be arranged closely along the wall so that for instance a painting comes to hang against the wall, and not at a distance therefrom.

In a further embodiment the corner clamp comprises an elongate third element to which the fastening member is coupled, and wherein the third element is directed obliquely upward during use and can support on a vertical corner of a space.

It is noted that a fastening member is not essential to the invention. The clamp can for instance also be combined with a platform on which an object can be placed. In that case the corner clamp is placed between two vertical walls and a suspended corner table is created.

The invention also relates to a method for providing a suspension point in a three-dimensional space. The first surface can be a first wall of the space and the second surface a second wall of the space.

In an embodiment the method further includes:
clamping a second corner clamp in a corner formed by a third and a fourth surface, and
tensioning a cord between the first corner clamp and the second corner clamp.

In this way a cord is tensioned along for instance a wall or a ceiling of a room, which cord can be used to hang articles on. Such a method can advantageously be used in for instance museums.

BRIEF DESCRIPTION OF THE DRAWINGS

Further advantages, features and details of the present invention will be further elucidated on the basis of a description of several embodiments with reference to the accompanying figures, in which:

FIG. 9 shows an embodiment of a clamp with curved plates which here make contact with the wall and the ceiling with their outer ends; and FIG. 10 shows an underside of an embodiment of a corner table which supports on a corner clamp clamped between two vertical walls.

DETAILED DESCRIPTION OF THE INVENTION

Figure 1:
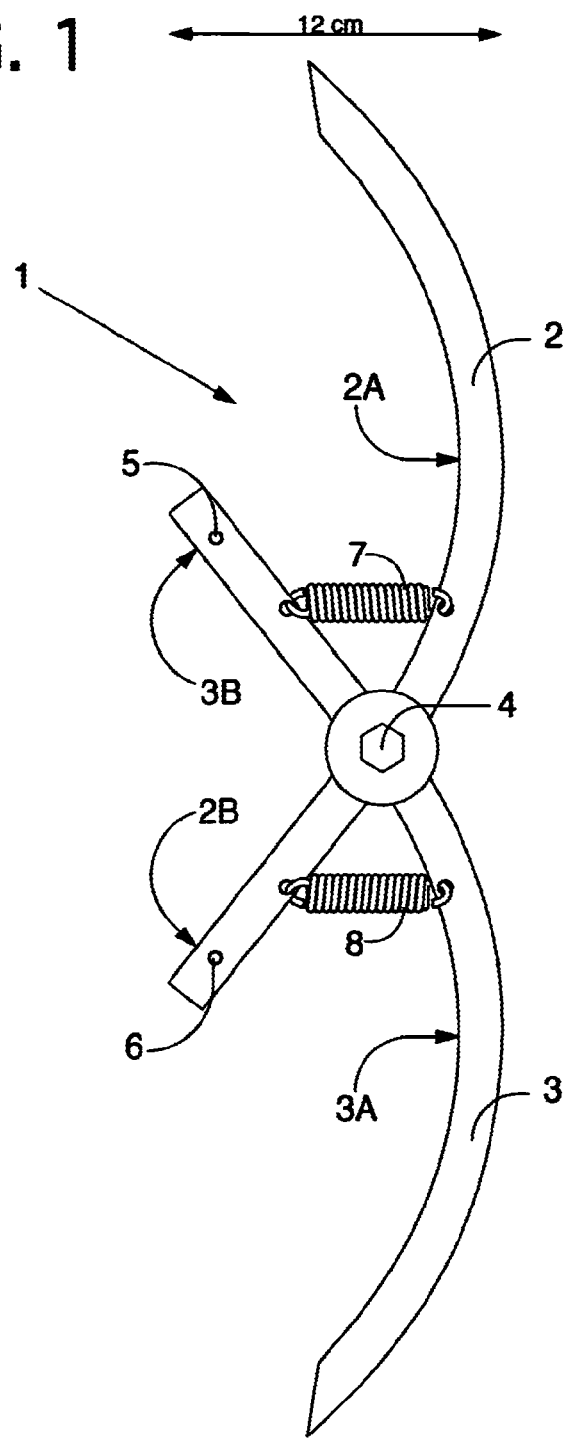
FIG. 1 shows schematically a corner clamp according to an embodiment of the invention.

FIG. 1 shows schematically a corner clamp 1 according to an embodiment of the invention. Corner clamp 1 comprises two elongate rigid elements 2,3 which are connected pivotally to each other at a pivot point 4. The word rigid is understood to mean that elements 2,3 are not flexible, at least not as a result of forces which occur during normal use. In the example of FIG. 1 elements 2,3 are connected via a metal bolt, although the skilled person will appreciate that many other options are possible. In this embodiment elements 2,3 consist of curved metal flat rods 2,3. Other forms and materials are possible. Element 2 has two arms 2A,2B and element 3 has two arms 3A,3B, see FIG. 1. Element 3 comprises a fastening member 5 which consists of a hole 5 arranged in flat metal rod 3. Also present in this embodiment is a second fastening member 6 which is arranged in arm 2B, see hole 6.

Corner clamp 1 further comprises two springs 7,8 which are arranged between elements 2,3 as shown in FIG. 1. Typical dimensions of the length of rods 2,3 are between 15-30 cm, and thicknesses between 0.2-2 cm. Other dimensions can be envisaged. Nor is the invention limited to the use of elongate rods. All elements with which pivot point 4 can be positioned at the correct location, and wherein there is sufficient grip on the surfaces, will suffice.

Figure 2:
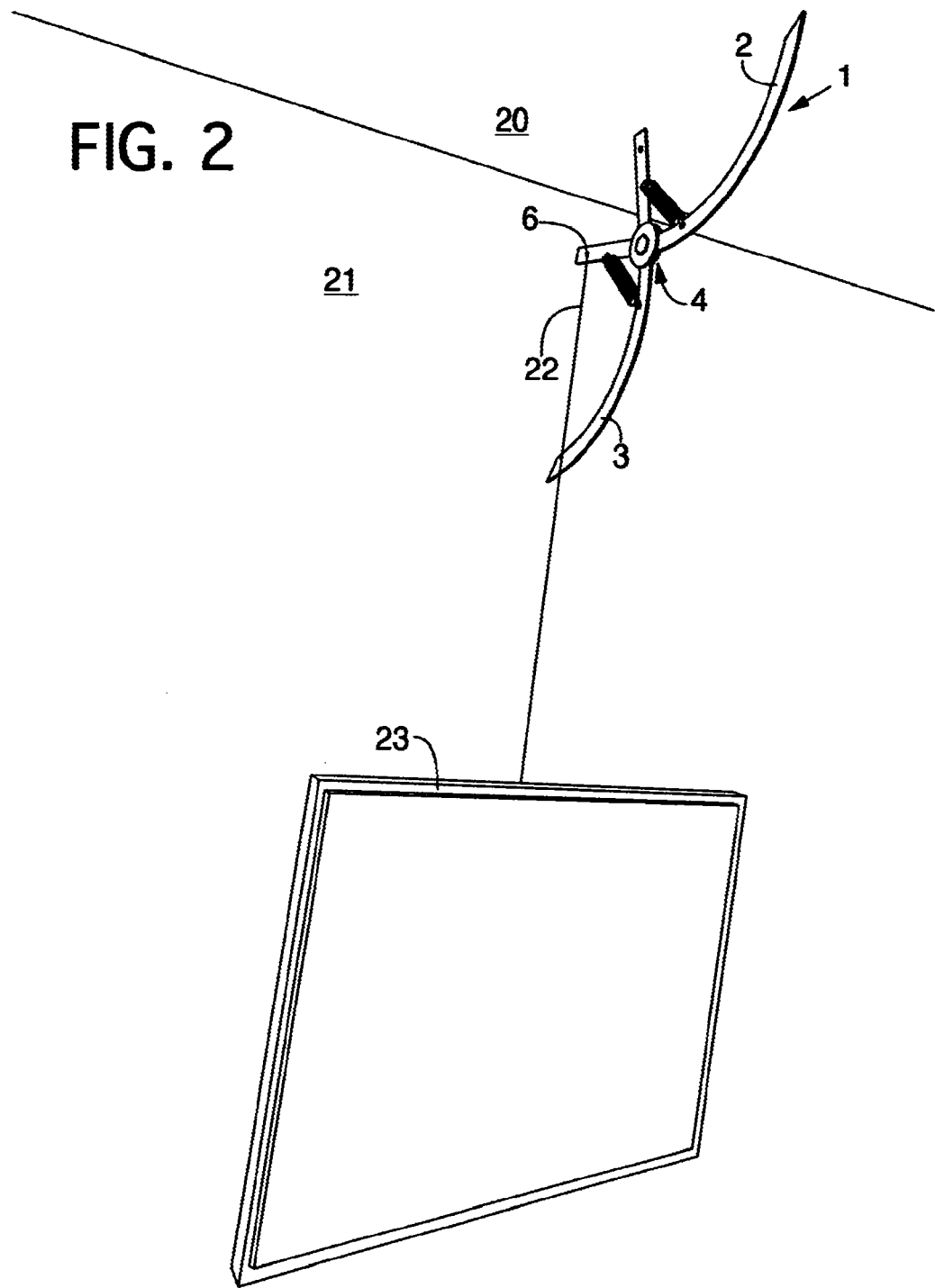
FIG. 2 shows the corner clamp of FIG. 1 in a corner between a ceiling and a wall.

FIG. 2 shows an example of clamp 1 in the position of use. Clamp 1 is arranged here in a corner between a ceiling 20 and a wall 21. Attached to fastening member 6 is a cord 22 from which is suspended a frame 23. The outer ends of elements 2, 3 are pointed and exert a friction force on wall 21 and ceiling 20 such that clamp 1 fixes (clamps) itself in the corner. System 1 can be used to hang diverse articles. Ceiling 20 and wall 21 are not damaged here, or hardly so, as is often the case in the prior art hanging of articles, wherein a hole is for instance made in the wall. Clamp 1 will become more firmly clamped between the two surfaces due to the article load, whereby even relatively heavy articles can be hung. As a result, the force away from the corner will continuously increase as the load produced by hanging the article increases. Corner clamp 1 is particularly suitable for (temporary) hanging of for instance articles for decoration, photo frames and so on.

Clamp 1 can be quickly arranged vertically (or horizontally) in and removed from a corner in one operation without further accessories and without fixation, so wholly without fixing means and without damage, or with only minimal damage, to the surfaces.

In an embodiment the force required for holding clamp 1 in place is achieved in the first instance by means of the spring force of a tensioning member, such as a torsion spring. This spring is here attached in or round pivot point 4 by means of for instance a split pin or the like, and can exert its spreading forces against for instance protrusions arranged on elements 2,3.

Figure 3:
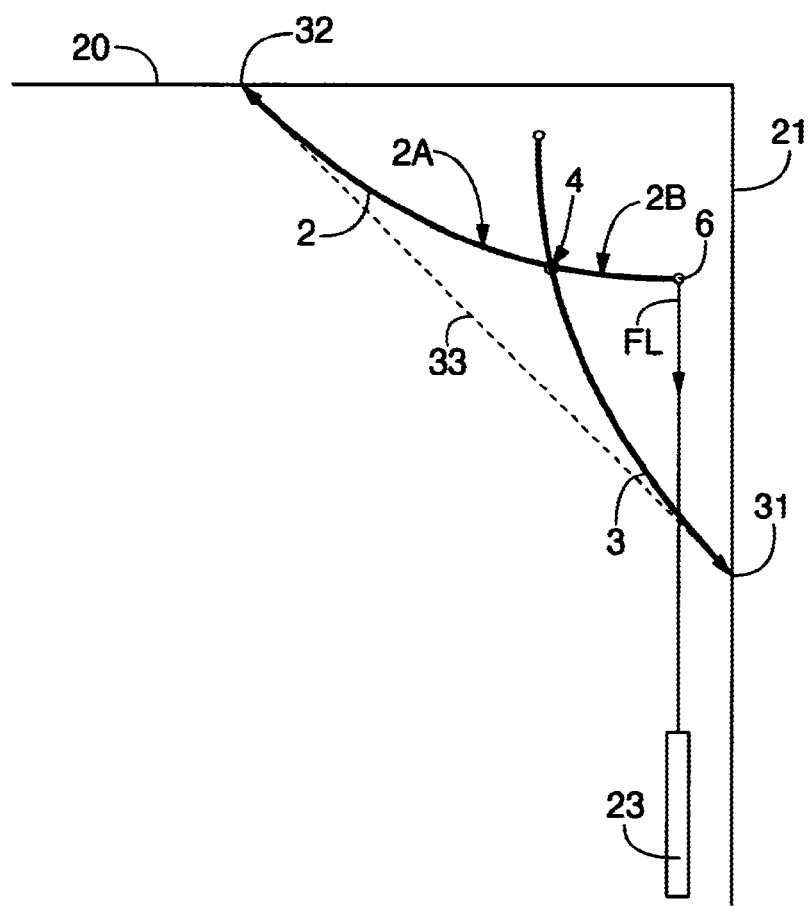
FIG. 3 shows schematically the clamp of FIG. 1, wherein the force exerted by the article is drawn.

FIG. 3 shows schematically clamp 1, wherein the force exerted by the article is drawn. The thicknesses of elements 2, 3 are not shown here for the sake of clarity. The weight of the suspended article 23 on fastening member 6 at the outer end of element 2 will produce a force $F_L$, see FIG. 3. Owing to a lever action of element 2 the force $F_L$ will result in a greater force on pivot point 4, which is converted to a force which presses two outer ends 31, 32 against respectively wall 21 and ceiling 20. Because fastening member 6 is situated at the end of arm 2B of element 2 the cord, and so article 23, can be positioned close to wall 21. As a result, the first rigid element 2 and the second rigid element 3 support on the surfaces 20, 21 in an outwardly directed clamping action.

Clamp 1 only works when there is sufficient grip of outer ends 31,32 on the associated surfaces. The grip depends on the friction force, which in turn depends on the force exerted by clamp 1. The grip can be increased by for instance making outer ends 31,32 sharp. In another embodiment the corner clamp comprises contact members in the form of so-called "feet" with a rough surface, made for instance of rubber, gel, sandpaper, spikes, suction cups or an adhesive. A so-called gecko adhesive strip can also be used. Such an adhesive strip adheres very well to diverse flat surfaces, such as plastic or glass, see for instance "Climbing rough vertical surfaces with hierarchical directional adhesion", Alan Asbeck, Sanjay Dastoor, Aaron Farness, Laurel Fullerton, Noe Esparza Daniel Soto, Barrett Heyneman, Mark Cutkosky; Stanford University, Stanford, Calif. 94305.

In FIG. 3, 33 indicates a line between outer ends 31,32. Pivot point 4 must not be positioned beyond this line, since otherwise the clamp comes loose.

Figure 4:
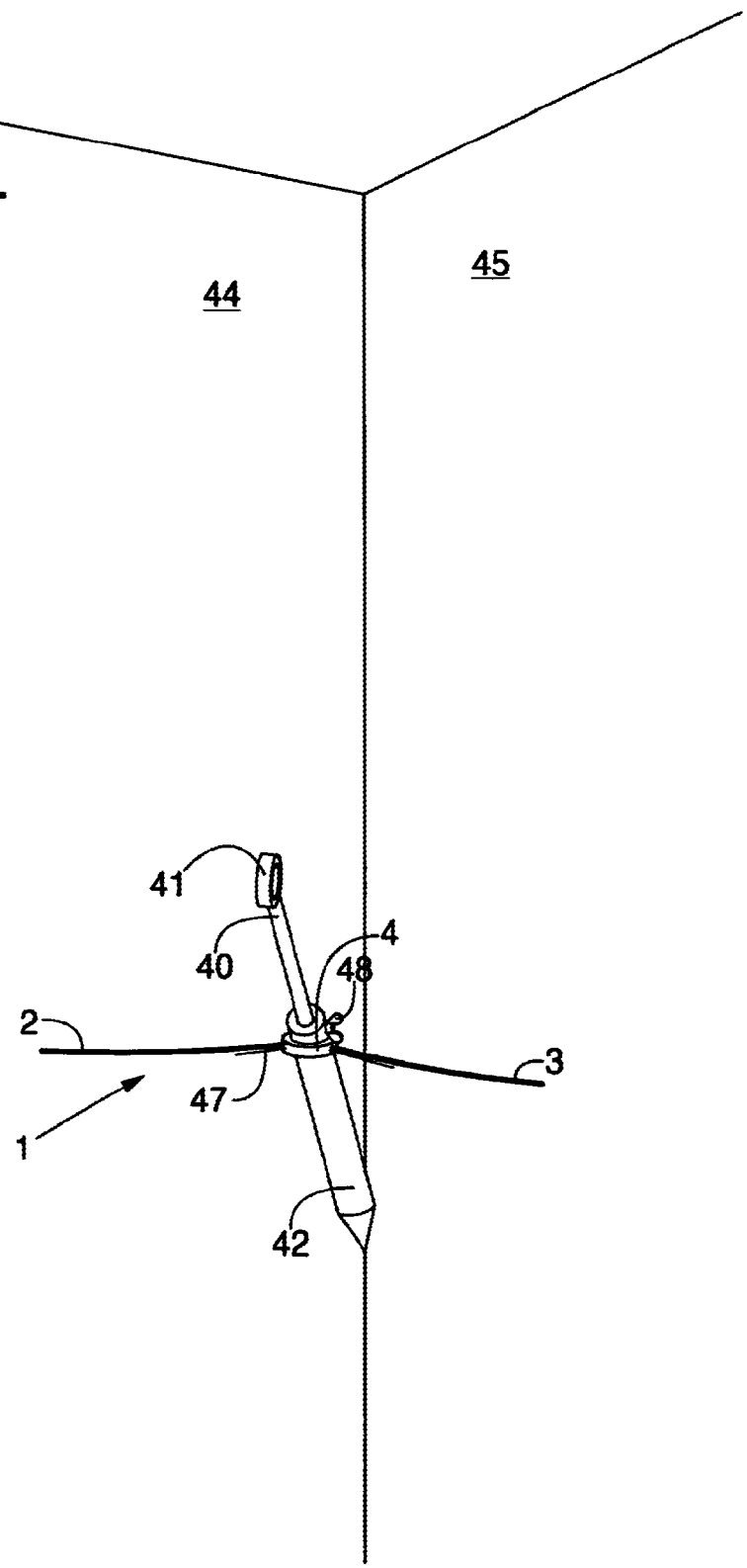
FIG. 4 shows an embodiment of the clamp wherein a third element, such as an extending rod, is present.

FIG. 4 shows an embodiment of clamp 1 with a third element, such as an extending rod 40 having thereon a ring 41 serving as attachment point.

In this example rod 40 is inserted into a tube 42, wherein tube 42 is fixed to a pivot member in or at pivot point 4. The two elements 2,3 are clamped under tension in the corner between two walls 44,45. Elements 2,3 are supported by tube 42, which is placed in the corner of two walls 44 and 45. In FIG. 4 reference numeral 47 shows a tension spring which pushes the two elements 2,3 apart and against the surfaces (walls). Also shown is a setting screw, see 48, which can be tightened so that rod 40 is fixed relative to tube 42.

Figure 5:
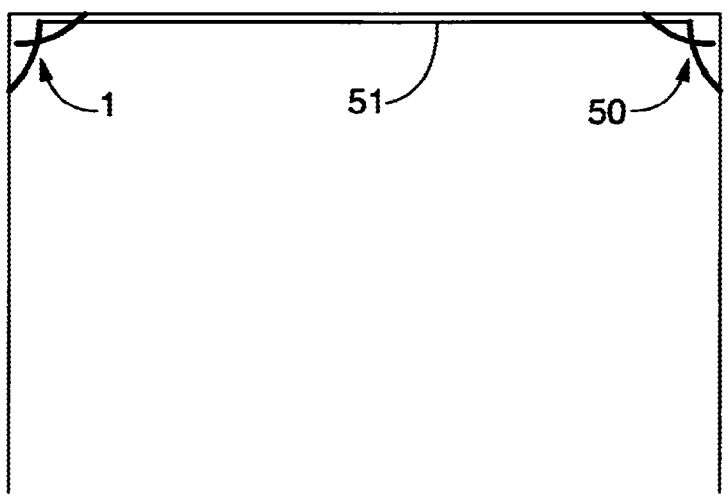
FIG. 5 shows the use of two clamping systems according to an embodiment.

FIG. 5 shows the use of two systems between which a cord is tensioned. The tensioned cord produces the forces caused in the above stated embodiments by the article 23 for hanging. FIG. 5 shows a top view of three walls of a room with a possible configuration, wherein a first clamp 1 and a second clamp 50 are placed in a horizontal plane with a cord 51 therebetween. Article 23 can then be hung from cord 51. If clamps 1,50 are not provided with their own tensioning member, cord 51 must be tensioned so that cord 51 secures clamps 1,50 in their corner.

Figure 6:
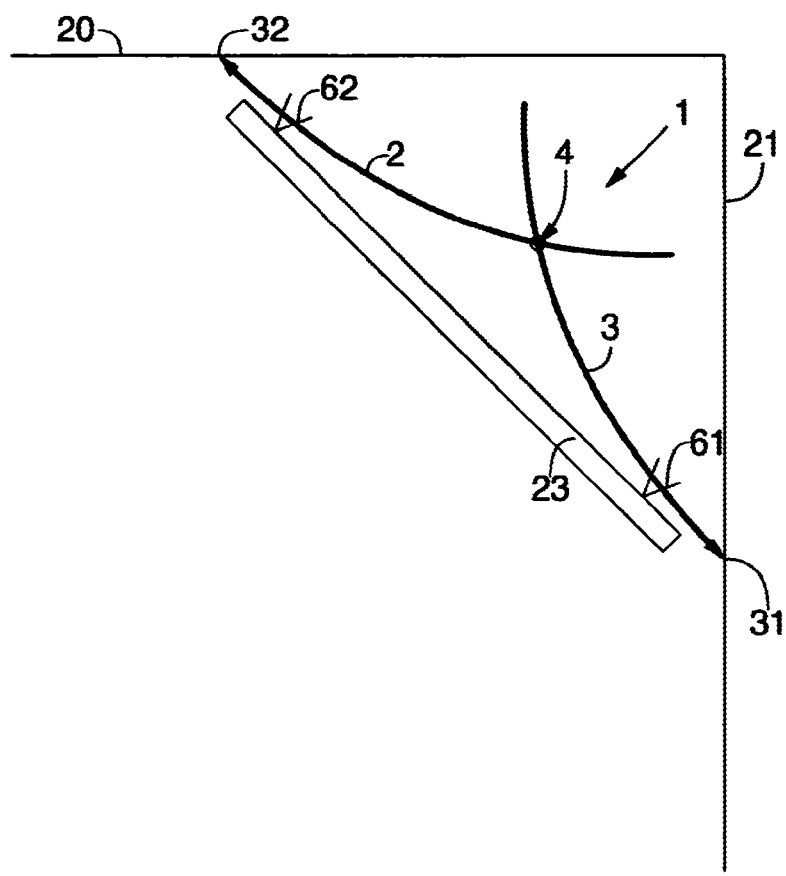
FIG. 6 shows a further embodiment of the clamp.

FIG. 6 shows an embodiment of clamp 1 wherein article 23 is fastened to clamp 1 using two fastening members 61,62. The article is for instance a photo frame or a mirror. In this embodiment clamp 1 will be largely concealed from view by the placed article.

Figure 7:
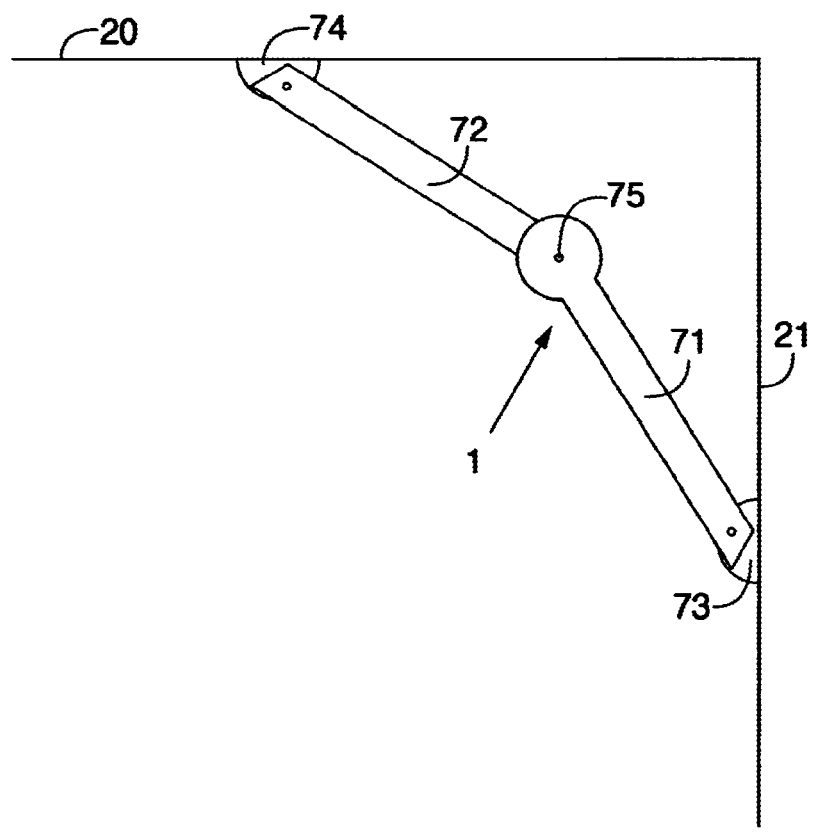
FIG. 7 shows schematically a further embodiment of the clamp, arranged in a corner.

FIG. 7 shows an embodiment of clamp 1 with a first element 71 and a second element 72. Elements 71 and 72 can be of different length. The pivot point is designated with 75. Clamp 1 comprises two contact members 73,74 which consist in this case of feet with a rough contact surface.

Figure 8:
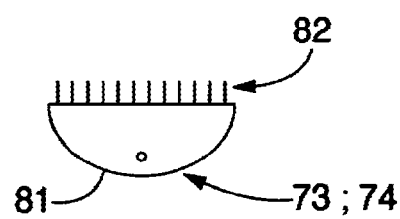
FIG. 8 shows a contact member of the clamp according to an embodiment.

FIG. 8 shows an embodiment of supports 73,74, which here each consist of a half-round body 81 with a number of sharp metal tips 82 arranged on body 81 on the side of the contact surface. If the feet of one of or both elements 71,72 must make contact with smooth surfaces, a rubber (or gel) cap (shoe) can be placed over the existing foot with the fine, sharp tips in order to protect the surface and to prevent sliding off. A plate is preferably placed in the rubber cap in order to prevent the fine, sharp tips being able to pierce the gel. The outer ends of the two legs of the cap can here be bent slightly inward for fixing to the foot.

FIG. 9 shows an embodiment of a corner clamp with two curved plates 2,3, which here make contact with wall 21 and ceiling 20 with their outer ends. At their contact points with wall 21 and ceiling 20 the curved plates 2,3 are preferably provided with a sawtooth or one or more spikes which pierce the relevant surfaces to some extent. In the example of FIG. 9 the plates are about 8 cm wide. Other dimensions can be envisaged, such as for instance between 2-20 cm. The advantage of the use of wide plates (for instance wider than 2 cm) relative to the rods of FIG. 2 is that clamp 1 can be arranged in more stable manner.

Present in one of the plates is an opening 91 through which runs a cord 92. In this way the cord can be attached in the centre of the clamp at a fastening point 93 and an article (not shown) such as a frame can be suspended from a suspension point 94.

FIG. 10 shows an underside of an embodiment of a corner table 100 which supports on a corner clamp which is clamped between two vertical walls 44,45. Elements 2,3 are clamped between the walls by means of a push spring 101. Depending on the embodiment, a vase or other object can be placed on table 100.

The present invention is described in the foregoing on the basis of several preferred embodiments. Different aspects of different embodiments are deemed described in combination thereof, wherein all combinations which can be made by a skilled person on the basis of this document should be included. These preferred embodiments are not limitative for the scope of protection of this text. The rights sought are defined in the appended claims.

The invention claimed is:

1. A corner clamp for supporting an article clampable between two surfaces substantially at right angles to each other and defining a corner therebetween by spreading to become fixed against the surfaces by a force away from the corner, comprising:
   a first rigid element comprising a first outer end for supporting on a first of the two surfaces;
   a second rigid element comprising a second outer end supportable on a second of the two surfaces, wherein the second element is coupled pivotally to the first element at a pivot point;
   wherein the corner clamp has one or more placing states in which the first rigid element and the second rigid element are positioned such that, when clamped in the corner, the pivot point is situated between the corner and a straight line running from the first outer end to the second outer end,
   the corner clamp comprising means for, when in a placing state, exerting a force away from the corner on the pivot point, the force being exerted by hanging the article from a fastening member; and
   wherein the force away from the corner continuously increases as a load produced by hanging, the article increases.

2. The corner clamp as claimed in claim 1, wherein a tensioning member which is adapted to spread the first rigid element and the second rigid element.

3. The corner clamp as claimed in claim 2, wherein the tensioning member comprises a torsion spring arranged in or round the pivot point.

4. The corner clamp as claimed in claim 1, wherein the first rigid element and the second rigid element are of identical form.

5. The corner clamp as claimed in claim 1, wherein the first rigid element and the second rigid element comprise one or more of:
   curved rods;
   curved elongate plates; or
   rods with two straight parts placed at an angle.

6. The corner clamp as claimed in claim 1, wherein the first outer end and the second outer end are tapering.

7. The corner clamp as claimed in claim 1, further comprising a first contact member and a second contact member mounted pivotally on respectively the first rigid element and the second rigid element.

8. The corner clamp as claimed in claim 7, wherein the first contact member and the second contact member comprise a contact surface for making contact with the associated surfaces, wherein the contact surfaces comprise one or more of:
   rubber;
   gel;
   gecko adhesive strip;
   sandpaper;
   spikes;
   suction cups; or
   adhesive.

9. The corner clamp as claimed in claim 1, wherein the second outer end has an outer end which is angular as seen from above, so that it can be placed in a corner of two vertical walls, wherein the first outer end is placed against a ceiling.

10. The corner clamp as claimed in claim 1, wherein the fastening member is for fastening the article.

11. The corner clamp as claimed in claim 10, wherein the first element comprises a first arm and a second arm which are defined by the pivot point, wherein the first arm ends at the first outer end and wherein the fastening member is arranged in or on the second arm.

12. The corner clamp as claimed in claim 11, wherein the second arm of the first element has a length such that, at least in use, the fastening member is positioned close to the surface with which a second contact member comes into contact.

13. The corner clamp as claimed in claim 10, wherein the corner clamp further comprises an elongate third element to which the fastening member is coupled, and wherein the third element is directed obliquely upward during use and can support on a vertical corner of a space.

14. The corner clamp as claimed in claim 1, further comprising a platform for supporting an object.

15. A method for supporting an article by providing a suspension point in a three-dimensional space between two surfaces substantially at right angles to each other and defining a corner therebetween by spreading to become fixed against the surfaces by a force away from the corner, comprising the step of:

clamping a first corner clamp as in a corner formed by a first and a second surface by means of, when in a placing state, exerting a force away from the corner on the pivot point, the force being exerted by hanging the article from a fastening member, wherein the force away from a corner continuously increases as the load produced by hanging the article creases.

16. The method as claimed in claim 15, wherein the first surface is a ceiling of the space and the second surface is a wall of the space.

17. The method as claimed in claim 15, wherein the first surface is a first wall of the space and the second surface is a second wall of the space.

18. The method as claimed in claim 15, wherein the method further comprises the steps of:

clamping a second corner clamp in a corner formed by a third and a fourth surface; and tensioning a cord between the first corner clamp and the second corner clamp.

19. A corner clamp for supporting an article clampable between two surfaces substantially at right angles to each other and defining a corner therebetween by spreading to become fixed against the surfaces by a force away from the corner, comprising:

a first rigid element comprising a first outer end for supporting on a first of the two surfaces;

a second rigid element comprising a second outer end supportable on a second of the two surfaces, wherein the second element is coupled pivotally to the first element at a pivot point;

wherein the corner clamp has one or more placing states in which the first rigid element and the second rigid element are positioned such that, when clamped in the corner, the pivot point is situated between the corner and a straight line running from the first outer end to the second outer end, the corner clamp comprising means for, when in a placing state, exerting a force away from the corner on the pivot point, the force being exerted by hanging the article from a fastening member, wherein the fastening member is for fastening the article, and wherein the first element comprises a first arm and a second arm which are defined by the pivot point, wherein the first arm ends at the first outer end and wherein the fastening member is arranged in or on the second arm.

20. The corner clamp as claimed in claim 19, wherein the second arm of the first element has a length such that, at least in use, the fastening member is positioned close to the surface with which a second contact member comes into contact.

* * * * *

UNITED STATES PATENT AND TRADEMARK OFFICE
CERTIFICATE OF CORRECTION

PATENT NO. : 9,282,832 B2
APPLICATION NO. : 13/056774
DATED : March 15, 2016
INVENTOR(S) : Wilhelmus Henricus Albertus Van Maasakkers It is certified that error appears in the above-identified patent and that said Letters Patent is hereby corrected as shown below:

In the Claims

Column 6, Line 34, Claim 1, delete "hanging," and insert -- hanging --

Column 7, Line 35, Claim 15, delete "creases." and insert -- increases. --

Signed and Sealed this
Fifth Day of July, 2016

Michelle K. Lee
*Director of the United States Patent and Trademark Office*